(12) United States Patent
Romine

(10) Patent No.: US 10,671,565 B2
(45) Date of Patent: Jun. 2, 2020

(54) PARTITIONING TARGET DATA TO IMPROVE DATA REPLICATION PERFORMANCE

(71) Applicant: QUEST SOFTWARE INC., Aliso Viejo, CA (US)

(72) Inventor: William James Romine, Aliso Viejo, CA (US)

(73) Assignee: QUEST SOFTWARE INC., Aliso Viejo, CA (US)

(*) Notice: Subject to any disclaimer, the term of this patent is extended or adjusted under 35 U.S.C. 154(b) by 358 days.

(21) Appl. No.: 14/695,681

(22) Filed: Apr. 24, 2015

(65) Prior Publication Data
US 2016/0314147 A1 Oct. 27, 2016

(51) Int. Cl.
*G06F 16/11* (2019.01)
*G06F 16/22* (2019.01)
*G06F 16/21* (2019.01)

(52) U.S. Cl.
CPC .......... *G06F 16/113* (2019.01); *G06F 16/214* (2019.01); *G06F 16/22* (2019.01)

(58) Field of Classification Search
CPC ... G06F 17/30073; G06F 16/113; G06F 16/22
USPC ........................................................ 707/740
See application file for complete search history.

(56) References Cited

U.S. PATENT DOCUMENTS

| 6,584,554 | B1 | 6/2003 | Dahlen et al. |
| 6,594,667 | B2 | 7/2003 | Dahlen et al. |
| 7,246,187 | B1 | 7/2007 | Ezra et al. |
| 7,472,233 | B2 | 12/2008 | McKenney et al. |
| 2003/0041173 | A1 | 2/2003 | Hoyle |
| 2003/0236957 | A1 | 12/2003 | Miller et al. |
| 2004/0225742 | A1 | 11/2004 | Loalza et al. |
| 2005/0102660 | A1* | 5/2005 | Chen ........................ G06F 8/65 717/168 |
| 2006/0117316 | A1 | 6/2006 | Cismas et al. |
| 2006/0159109 | A1* | 7/2006 | Lamkin ............. G06F 17/30174 370/401 |
| 2007/0150665 | A1 | 6/2007 | Arimill et al. |
| 2008/0098160 | A1* | 4/2008 | Slyz ....................... G06F 8/658 711/103 |
| 2008/0320262 | A1 | 12/2008 | McKenney et al. |
| 2010/0192224 | A1 | 7/2010 | Ferri et al. |
| 2010/0275216 | A1 | 10/2010 | Crowell et al. |
| 2012/0089735 | A1 | 4/2012 | Attaluri et al. |

(Continued)

OTHER PUBLICATIONS

U.S. Appl. No. 14/665,315 Office Action dated Aug. 11, 2016.

*Primary Examiner* — Jensen Hu
(74) *Attorney, Agent, or Firm* — Maschoff Brennan

(57) ABSTRACT

The presently claimed invention relates to a system and method for organizing data replicated in a target data repository. The method of the presently claimed invention may receive data from a primary data store for replication in the target data repository. The method may then determine that the received data should be organized and stored according to one or more priority metrics. The method may then organize the received data according to the one or more priority metrics, and store the received data based on the priority metrics. Higher priority data may be stored faster data storage devices or be stored in smaller files where lower priority data may be stored in slower data storage devices or be stored in larger files.

20 Claims, 4 Drawing Sheets

(56) References Cited

U.S. PATENT DOCUMENTS

| | | | |
|---|---|---|---|
| 2012/0265727 A1* | 10/2012 | Naryzhnyy | G06F 16/254 707/602 |
| 2012/0311606 A1 | 12/2012 | Marathe et al. | |
| 2013/0124483 A1* | 5/2013 | Furuhashi | G06F 17/30315 707/661 |
| 2013/0290404 A1 | 10/2013 | Rajabi et al. | |
| 2014/0143649 A1* | 5/2014 | Bridgen | G06F 16/9574 715/234 |
| 2014/0244943 A1 | 8/2014 | Jacobs et al. | |
| 2014/0304309 A1* | 10/2014 | Diederich | G06F 17/30073 707/812 |
| 2014/0344928 A1 | 11/2014 | Sreedharan et al. | |
| 2014/0358863 A1* | 12/2014 | Bennett | G06F 17/30073 707/665 |
| 2015/0120658 A1* | 4/2015 | Rath | G06F 17/30575 707/623 |
| 2015/0213259 A1 | 7/2015 | Du et al. | |
| 2016/0132364 A1 | 8/2016 | Huang et al. | |
| 2016/0328175 A1 | 11/2016 | Zhang | |

\* cited by examiner

PARTITIONING TARGET DATA TO IMPROVE DATA REPLICATION PERFORMANCE

BACKGROUND OF THE INVENTION

Field of the Invention

The presently claimed invention is generally related to copying data from a primary data storage location to a secondary data storage location. More specifically the presently claimed invention is related to optimizing the performance of updating data in a replicated data store.

Description of the Related Art

Computer systems that manipulate large data sets must occasionally copy data from one large place to another. Conventionally data from a first place (i.e. a first database) is copied (replicated) into a second place (i.e. a second database). In order to maintain coherency between a first and a second database, either the entire database must be re-copied, or changes in the data contained in the first database must be merged into the second database. In certain instances the process of merging changed data into the second database is inefficient. For example, when the second database uses a write-once file system data residing at the second database must be read, changes in the data must then be merged with the data from the second database, and the combined data must be re-written. When the databases contain large amounts of data this process may be inefficient and slow.

An exemplary instance where this issue arises is when data managed by a relational database management system (RDBMS) such as an Oracle database is copied into Hadoop. Hadoop is an open-source software framework that manages large data sets using a Hadoop distributed file system (HDFS) that is a write-once file system. Data from a RDBMS database are commonly copied into Hadoop when performing functions such as archiving data, warehousing data, or parsing data to gather intelligence from the data. Examples of replication data from an RDBMS database to Hadoop are utilized by application such as Shareplex by DELL, Golden Gate by Oracle, and Tungsten by Continuent.

What is needed is a system and a method that allows databases to be rapidly replicated and updated without incurring delays associated with conventional data replication approaches.

SUMMARY OF THE PRESENTLY CLAIMED INVENTION

Embodiments of the presently claimed invention relate to a system and method for organizing and replicating data in a target data repository. A method of the presently claimed invention may receive data from a primary data repository. The data from the first data repository may then be separated into a first and a second data set. The first and second data set may be assigned a priority according to one or more priority metrics. The first data set may be assigned a first priority level and the second data set may be assigned a second priority level after which the first and the second data sets may be stored according to the one or more priority metrics.

The presently claimed invention may be implemented as a software program (i.e.: a non-transitory data storage medium) that receives data for storage from a primary data repository. The data from the first data repository may then be separated into a first and a second data set by the software program. The first and second data set may be assigned a priority according to one or more priority metrics. The first data set may be assigned a first priority level and the second data set may be assigned a second priority level by the software program after which the first and the second data sets may be stored according to the one or more priority metrics.

An apparatus of the presently claimed invention may be any computing device that receives data from a primary data repository for storage at a target data repository. The apparatus may include a memory and a processor. The processor may execute instructions out of the memory to separate data received from a primary data repository into a first data set and a second data set. The processor may also assign a first priority level to the first data set and a second priority level to the second data set. The processor executing instructions may then organize the received data according to one or more priority metrics and store the organized data in the target data repository.

DETAILED DESCRIPTION

Embodiments of the presently claimed invention relate to a system and method for organizing and replicating data in a target data repository. The method of the presently claimed invention may receive data from a primary data store for replication in the target data repository. The method may then organize and store the received data according to the one or more priority metrics where higher priority data is separated from lower priority data. The presently claimed invention may organize higher priority data in smaller files or store higher priority data in faster data storage devices. The presently claimed invention may also store lower priority data in slower data storage devices or in larger files. The presently claimed invention may prioritize data based on how likely that data will be accessed in the future.

In certain instances the presently claimed invention may receive a data table from a first data repository, split (partition) the table into a plurality of files, and store that data in a secondary data store. Since the presently claimed invention splits data into multiple files instead of using a single file, the process of updating data in the second data store is made more efficient. The presently claimed invention may also organize these files according to a priority where files assigned a higher probability are more likely to change than files with a lower probability of change. The presently claimed invention may store data/files that are more likely to change in a faster data storage medium. For example, data that is more likely to change may be stored on a solid state disk drive instead of a rotating magnetic media disk drive. By storing higher priority data on a faster data storage device the process of reading, modifying, and writing changes in the higher priority data is made quicker.

The presently claimed invention may also store data that is more likely to change in a smaller file and store data that is less likely to change in a larger file. The presently claimed invention improves the performance of maintaining coherency between a first and a second database because files that are more frequently updated may contain less data to read, modify, and re-write than files that are less frequently updated.

Figure 1:
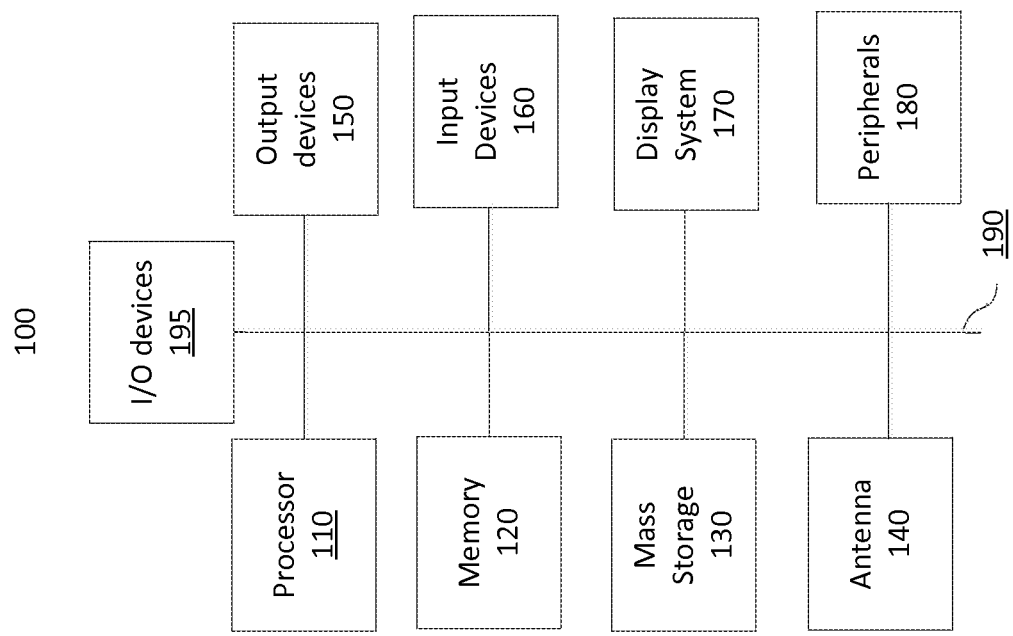
FIG. 1 illustrates a block diagram of a computing device that may be used to implement various embodiments of the presently claimed invention.

FIG. 1 illustrates a block diagram of a computing device that may be used to implement various embodiments of the presently claimed invention. FIG. 1 illustrates an exemplary computing system 100 that may be used to implement a computing device with the present technology. Note that FIG. 1 is exemplary and that all features shown in the figure may not be included in a system implementing the presently claimed invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the presently claimed invention for purposes of loading that software into main memory 120. The system software for implementing embodiments of the presently claimed invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the presently claimed invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the presently claimed invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

Figure 2:
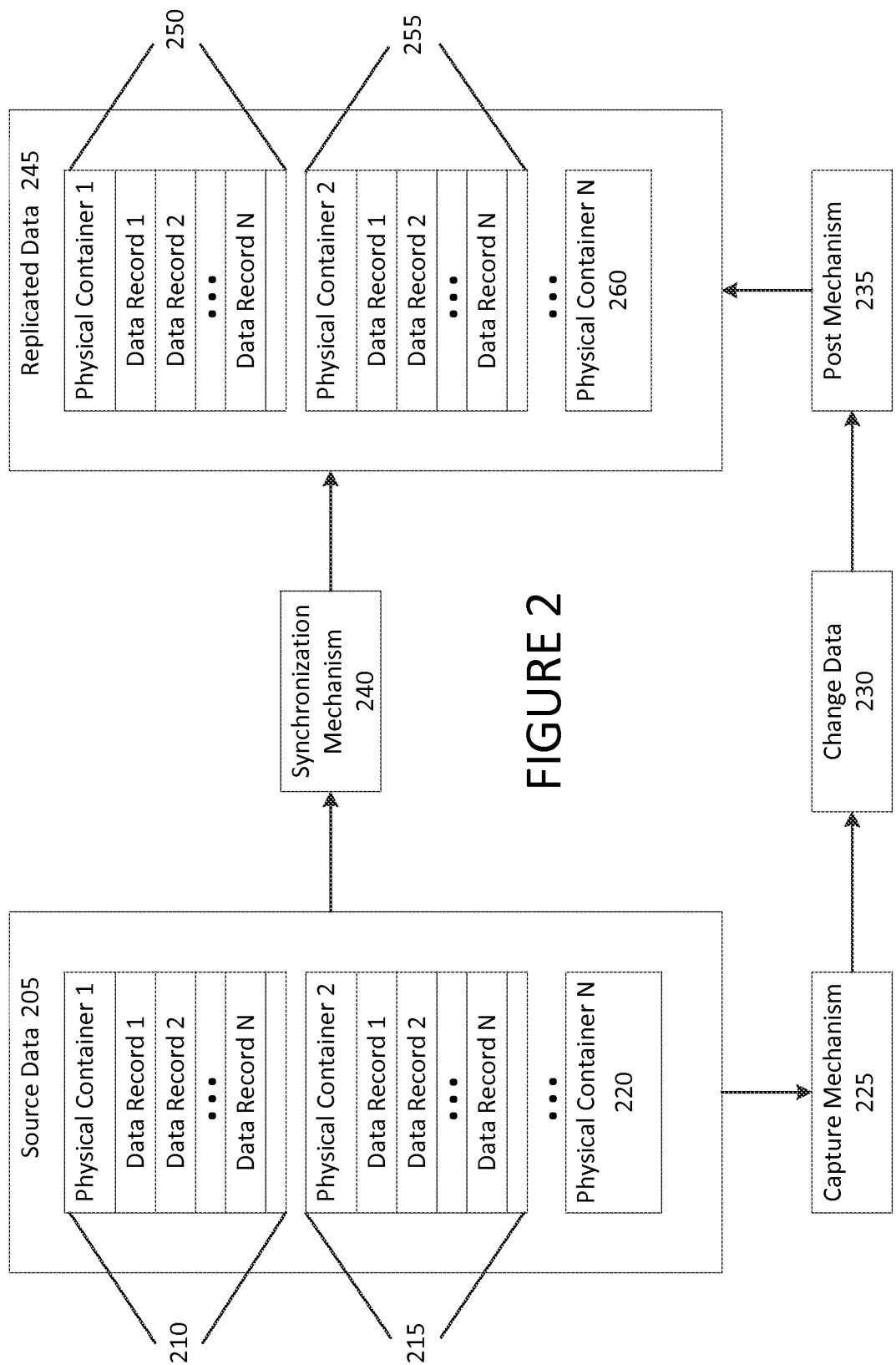
FIG. 2 illustrates an exemplary set of source data that is replicated.

FIG. 2 illustrates an exemplary set of source data that is replicated.

Source data 205 includes physical container 1 210, physical container 2 215, and physical container N 220. Replicated data 245 includes physical container 1 250, physical container 2 255, and physical container N 260. FIG. 2 also includes a capture mechanism 225, change data 230, a post mechanism 235, and a synchronization mechanism 240. Each of the physical containers 210, 215, 220, 250, 255, and 260 may contain a plurality of data records zero through N. Examples of data records include, yet are not limited to a text file, a line of text within a text file, an XML document, a node within an XML document or rows within a database table. Data contained within a data record may include data of a same data type. For example, each row in a database file may represent a customer in a table that contains a plurality of customers. In other instances a table may contain data of different types, data such as a pdf file, image data, scientific data, or other data may be stored in a table. The database data may also store documents that are organized differently.

Synchronization mechanism 240 initially copies data from source data 205 when replicated data set 245 is created. The synchronization mechanism 240 may pause (quiesce) activity acting upon the source data 205 until the source data 205 is replicated 245. Alternatively a snapshot of the source data 205 may be replicated 245 and then be updated periodically. After the replicated data 245 set is created capture mechanism 225 may capture incremental updates to the source data 205 over time.

Capture mechanism 225 may utilize hooks at the application level, the operating system level, the I/O driver level, or at other levels of the software stack when capturing changes. In the case of an RDBMS a transaction log may be used to temporarily store change data 230. In an RDBMS a trigger mechanism may also be used to capture changes. The capture mechanism 225 collects changes to the source data 205 and generates change data 230 to feed to the post mechanism 235.

The change data 230 may represent changes to one or more source records. The change data 230 could be or include a binary difference or a text difference. In the case of an RDBMS, change data 230 could managed using a data manipulation language (DML) or a data definition language (DDL) operation on the source records. The change data 230 may be contained within structures, may include binary data, data in an XML or SQL format, or include other types of data. The change data 230 may be stored in random access memory, flash memory, on a disk drive, in cloud storage, or in another form of data storage device.

The post mechanism 235 may take the change data 230 and apply it to the replicated data 245 to bring the replicated data 245 into synchronization with the source data 205. The process of capturing the changes and posting the change data 230 may be a continuous process. The processes of capturing and posting change data 230 may be paused when needed by an application. This process may also be paused to re-synchronize the replicated data 245 with the source data 205 using synchronization mechanism 240.

Techniques used by the post mechanism 235 to post change data 230 may vary depending on a type of replicated data 245 and how the replicated data 245 is stored. For example when data is replicated from a first RDBMS to a second RDBMS the physical containers 210, 215, 220, 250, 255, and 260 may represent partitions within a table, and the data records 1-N may represent rows within a table. To post a DML operation that modifies data in the source table, the post mechanism 235 may execute the same DML operation on the target replicated data 245. To post an "Insert," the RDBMS only need append a row to the target table. To post an "Update" or "Delete" operation, the RDBMS may locate a matching row either through a table scan or an index lookup. The RDBMS may then update or delete the row.

Consider replication from an RDBMS to file system storage such as HDFS. In this case the physical containers on the target represent separate files within HDFS. To post an "Update" or "Delete" operation the post mechanism must merge these changes with the existing files on HDFS. Since HDFS is a write-once file system changed files on HDFS must be read, the changes merged in, and a new file must be written. The post mechanism may post "Insert" operations by writing new files or by appending data to existing files.

This presently claimed invention improves the performance of posting data to the replicated data 245 store. A method consistent with the presently claimed invention may arrange an amount of data stored in physical containers 250, 255, & 260 when optimizing the performance of posting changes to the replicated data 245 set. For example, consider posting "Update" or "Delete" operations to a target RDBMS. In this instance the presently claimed invention may organize rows into two or more physical containers in the replicated data set 245. A physical container used to hold a particular row may be based on the probability that that row will be modified in the near term future. These physical containers may be stored on different physical devices with different cost and performance characteristics. For example physical containers containing rows with a high probability of update may be stored on a solid state disk while the other physical containers with a lower probability of update may be stored on a slower rotating magnetic disk drive. Typically the solid state disk will be faster, yet more expensive per unit storage than the magnetic disk. By storing data that has a higher probability of update on faster storage the posting performance of the system may be improved. By balancing this with storing rows with a lower probability of update on slower data storage devices, the replicated data 245 may be managed in a more cost effective way.

In another example, consider posting "Update" or "Delete" operations to a replicated data 245 repository file system such as HDFS. In this instance, the presently claimed invention may organize rows into two or more physical containers in the replicated data 245 repository. A physical container used to hold a row may be based on the probability that rows will be modified. A physical container managed by HDFS may be a file. In order to update or delete data within an HDFS file, the file must be rebuilt by reading the file, merging changes and then writing the new data. Change data may be collected and updates to data in a replicated data store may be updated by batching multiple modifications together. By storing the data rows in multiple physical containers the updating of an individual file is simplified. Furthermore, when we organize data records such that the data records with a higher probability of modification are stored within a particular physical container, the number of physical containers that require rebuilding may be reduced.

In the instance where a very large table contains a significant amount of stale data, change data may be concentrated in the most recent 1% or 0.01% of data rows of the table. The presently claimed invention can reduce the rebuild effort required by several orders of magnitude when data from the table are replicated in a set of different files.

Figure 3:
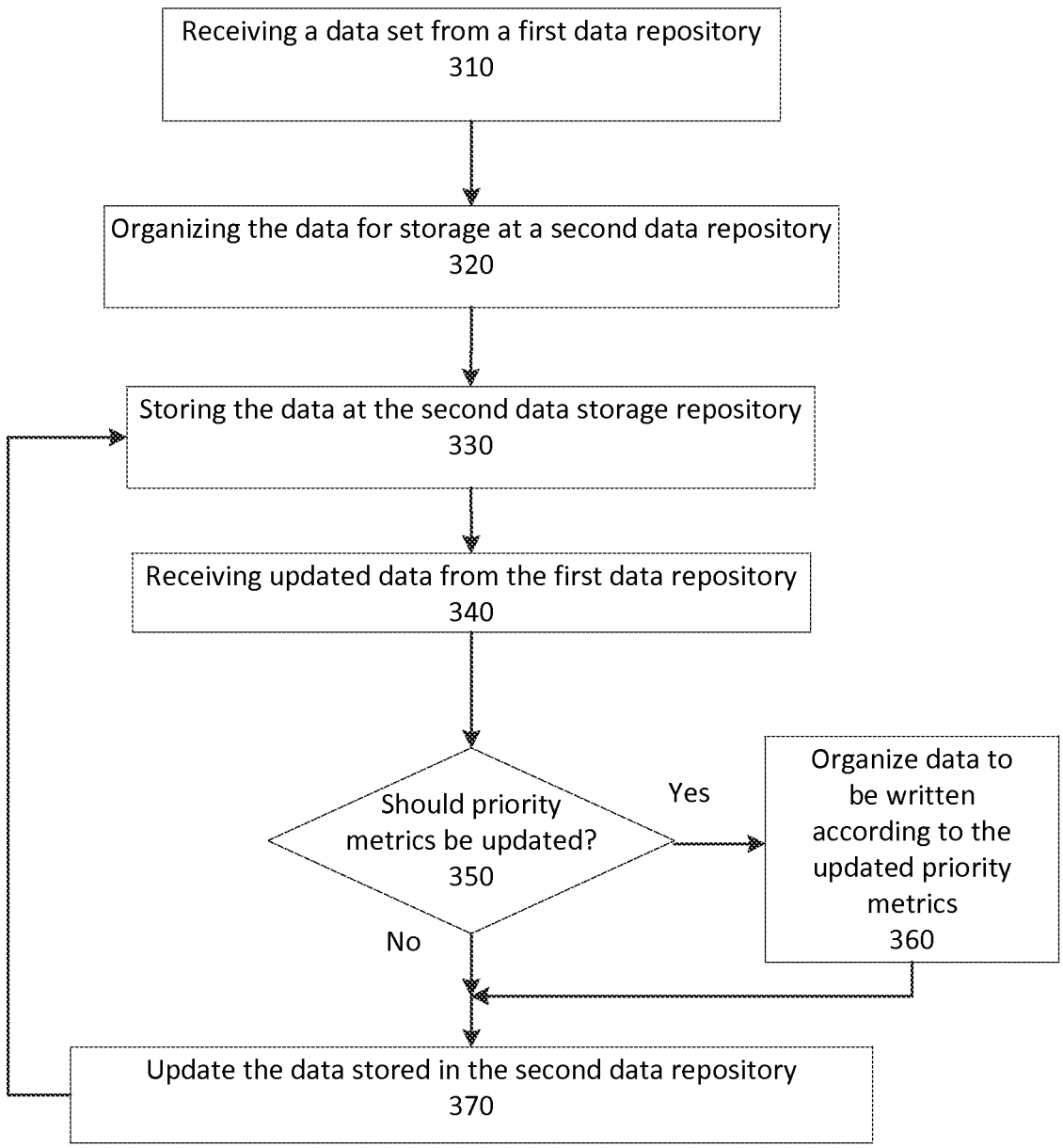
FIG. 3 illustrates an exemplary method for replicating data in a secondary data repository.

FIG. 3 illustrates an exemplary method for replicating data in a secondary data repository. FIG. 3 begins with step 310 where data is received from a first data storage repository for storage in a second data storage repository. In step 320 the data may be organized for storage at the second data storage repository. Step 320 may organize the data according to one or more priority metrics, a synchronization mechanism may determine one or more sets of data that have a high priority. Higher priority data may be split into one or more files before being stored in step 330. Higher priority data sets may also be stored on faster data storage devices in step 330. The presently claimed invention may assign a priority level, where a priority level may correspond to how likely a particular data record will be modified in the future.

Periodically an update may be received from the first data repository in step 340. After updated data is received from the first data repository, the presently claimed invention may determine whether the priority metrics should be updated in step 350, when yes, program flow moves to step 360 where the data may be re-organized and then stored in the second data repository in step 370. When the priority of the data should not be updated, program flow moves to from step 350 to step 370 where the data is stored in the second data repository.

Figure 4:
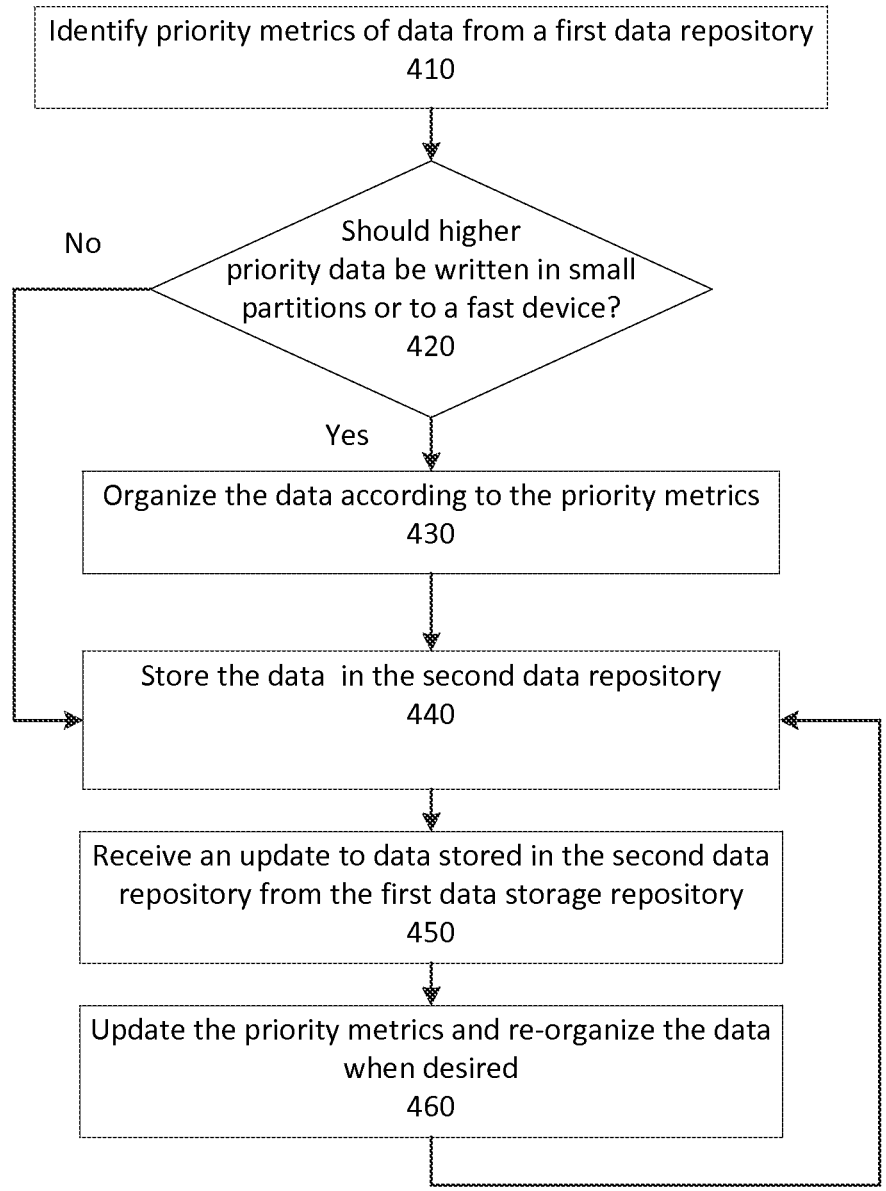
FIG. 4 illustrates another exemplary method for replicating data in a secondary data repository.

FIG. 4 illustrates another exemplary method for replicating data in a secondary data repository. FIG. 4 begins with step 410 where priority metrics may be identified for data received from a first data repository. Next step 420 determines whether higher priority data should be written in small partitions or to a fast data storage device, when yes, program flow moves to step 430. Step 430 organizes the data according to the priority metrics and then step 440 stores the data in the second data repository. Depending on the priority metrics and priority rules higher priority data may be written into a small partition (i.e. a small file), be stored on a fast data storage device, or both.

When higher priority data does not have to be re-organized program flow may flow from step 420 to step 440 where the data is stored at the second data storage repository. Next in step 450 updated data may be received from the first data storage device. In step 460 priority metrics associated with the data may be updated and the data may be re-organized if desired. Then program flow moves back to step 440 where the updated data may be stored in the second data repository.

A synchronization mechanism may use various techniques when estimating the probability that a data record will be modified in the future. In certain instances, data within the data record itself may contain information we can use to predict future updates. For example, when the source data is an RDBMS table containing customer order information, the table may contain a column for order date or a column for order status. The order date field may be used as a predictor of probability of modification because a new order has a higher probability of change than an older order. Similarly the order status column may also be a good predictor. When the order status indicates that an order is complete, the priority of that order may be lowered because it is less likely that a complete order will receive future modifications.

Another technique for setting the priority of a data set is to look at the age of a data record. In RDBMS this can be approximated by looking at the location of a row within a table stored in the physical storage. Rows closer to the start of the physical storage of a table are more likely to be older rows. The physical location of a row can be determined by its ROWID when using an Oracle database. Identifying the relative position of one ROWID versus another ROWID in a database may be used to identify a relative probability that a particular row will be updated in the future. The presently claimed invention may group rows that are physically close together in the same physical container and rows that are physically far apart may be stored in different physical containers in a replicated data set.

The size physical containers stored in the repository, as noted above, need not be the same as each other. Data records with a high probability of update may be organized into smaller physical containers to increase the performance advantages noted above.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description are not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A method for organizing replicated data stored in a target data repository, the method comprising:
   receiving data for storage in the target data repository from a primary data repository, wherein the received data is associated with a data structure, wherein the primary data repository includes a relational database, wherein the target data repository includes a write-once file system;
   separating the received data into a first data set and a second data set according to one or more priority metrics, wherein the first data set is assigned a first priority level and the second data set is assigned a second priority level;
   splitting the first data set into a plurality of data files;
   separating the plurality of data files into a first data file and a second data file, wherein the first data file is assigned a higher probability of changing with respect to the first data set, than the second data file;
   storing the received data based on the priority metrics into different data files that include the first data file of the plurality of data files;
   identifying that data associated with the first data set has changed;
   updating the first data set with the changed data, wherein the updating of the first data set includes re-writing at least a portion of the first data file; and
   rebuilding the data associated with the data structure by:
      combining the first data set with the second data set; and
      writing the data associated with the data structure as a new file in the write-once file system.

2. The method of claim 1, wherein the first data set is stored on a first type of data storage device, and the data structure is a table, wherein the changed data is associated with information stored in at least one row of the table.

3. The method of claim 2, wherein the second data set is stored on a second type of data storage device.

4. The method of claim 1, wherein the first data set is organized in the first data file and the second data set is organized in a second data file, wherein the first file is split into the plurality of data files, wherein at least one of the first data file or each data file of the plurality of data files are smaller than the second data file.

5. The method of claim 1, wherein the primary data storage repository is a relational database management system (RDBMS) and the target data storage repository includes a Hadoop distributed file system (HDFS).

6. The method of claim 1, wherein the primary and the target data storage repositories are both relational database management systems (RDBMS).

7. The method of claim 1, further comprising:
   receiving data for storage in the target data repository from a primary data repository;
   identifying that the received data should be re-organized according to one or more priority metrics;
   re-organizing the received data according to the one or more priority metrics; and
   storing the received data based on the priority metrics.

8. The method of claim 1, further comprising:
   receiving data for storage in the target data repository from a primary data repository; and
   storing the received data based on current priority metrics.

9. A non-transitory computer readable storage medium having embodied thereon a program executable by a processor for organizing replicated data stored in a target data repository, the method comprising:
   receive data for storage in the target data repository from a primary data repository, wherein the received data is associated with a data structure, wherein the primary data repository includes a relational database, wherein the target data repository includes a write-once file system;
   separate the received data into a first data set and a second set according to one or more priority metrics, wherein the first data set is assigned a first priority level and the second data set is assigned a second priority level;
   split the first data set into a plurality of data files;
   separate the plurality of data files into a first data file and a second data file, wherein the first data file is assigned a higher probability of changing with respect to the first data set, than the second data file;

store the received data based on the priority metrics into different data files that include the first data file;

identify that data associated with the first data set has changed;

updating the first data set with the changed data, wherein the updating of the first data set includes re-writing at least a portion of the first data file; and rebuild the data associated with the data structure by:
combining the first data set with the second data set; and writing the data associated with the data structure as a new file in the write-once file system.

10. The non-transitory computer readable storage medium of claim 9, wherein the first data set is stored on a first type of data storage device, and the data structure is a table, wherein the changed data is associated with information stored in at least one row of the table.

11. The non-transitory computer readable storage medium of claim 10, wherein the second data set is stored on a second type of data storage device.

12. The non-transitory computer readable storage medium of claim 9, wherein the first data set is organized in the first data file and the second data set is organized in a second data file, wherein the first file is split into the plurality of data files, wherein at least one of the first file or each data file of the plurality of data files are smaller than the second data file.

13. The non-transitory computer readable storage medium of claim 9, wherein the primary data storage repository is a relational database management system (RDBMS) and the target data storage repository includes a Hadoop distributed file system (HDFS).

14. The non-transitory computer readable storage medium of claim 9, wherein the primary and the target data storage repositories are both relational database management systems (RDBMS).

15. The non-transitory computer readable storage medium of claim 9, the program further executable to:
receive data for storage in the target data repository from a primary data repository
identify that the received data should be re-organized according to one or more priority metrics;
re-organize the received data according to the one or more priority metrics; and
store the received data based on the priority metrics.

16. The non-transitory computer readable storage medium of claim 9, the program further executable to:
receive data for storage in the target data repository from a primary data repository; and
store the received data based on current priority metrics.

17. An apparatus for organizing replicated data stored in a target data repository, the apparatus comprising:
a memory;
a data communication interface that receives data for storage in the target data repository from a primary data repository, wherein the received data is associated with a data structure, wherein the primary data repository includes a relational database, wherein the target data repository includes a write-once file system; and
a processor that executes instructions stored in memory to:
separate the received data into a first data set and a second data set according to one or more priority metrics, wherein the first data set is assigned a first priority level and the second data set is assigned a second priority level;
split the first data set into a plurality of data files;
separate the plurality of data files into a first data file and a second data file, wherein the first data file is assigned a higher probability of changing with respect to the first data set, than the second data file;
organize the received data for storage in the target data repository based on the priority metrics into different data files that include the first data file;
identify that data associated with the first data set has changed;
update the first data set with the changed data, wherein the updating of the first data set includes re-writing at least a portion of the first data file; and
rebuild the data associated with the data structure by:
combining the first data set with the second data set; and
writing the data associated with the data structure as a new file in the write-once file system.

18. The apparatus of claim 17, wherein the first data set is stored on a first type of data storage device, and the data structure is a table, wherein the changed data is associated with information stored in at least one row of the table.

19. The apparatus of claim 18, wherein the second data set is stored on a second type of data storage device.

20. The apparatus of claim 17, wherein the first data set is organized in the first data file and the second data set is organized in a second data file, wherein the first file is split into the plurality of data files, wherein at least one of the first data file or each data file of the plurality of data files are smaller than the second data file.

* * * * *